(12) United States Patent
Haverinen

(10) Patent No.: US 8,798,924 B2
(45) Date of Patent: Aug. 5, 2014

(54) UTILIZING MAGNETIC FIELD BASED NAVIGATION

(71) Applicant: IndoorAtlas Oy, Oulu (FI)

(72) Inventor: Janne Haverinen, Kiviniemi (FI)

(73) Assignee: Indooratlas Oy, Oulu (FI)

( * ) Notice: Subject to any disclaimer, the term of this patent is extended or adjusted under 35 U.S.C. 154(b) by 0 days.

(21) Appl. No.: 13/734,365

(22) Filed: Jan. 4, 2013

(65) Prior Publication Data

US 2013/0179074 A1 Jul. 11, 2013

(30) Foreign Application Priority Data

Jan. 11, 2012 (FI) .................................. 20125031

(51) Int. Cl.
*G01C 21/10* (2006.01)

(52) U.S. Cl.
USPC ............ 701/500; 701/525; 701/400; 701/408

(58) Field of Classification Search
USPC ............ 701/400, 408, 525; 301/1, 2, 6, 8, 12, 301/14, 15, 17, 23, 25, 26, 29, 32, 33, 34, 301/35, 39, 40, 42, 230; 29/744, 740, 738, 29/736, 609, 419.2, 25.01
See application file for complete search history.

(56) References Cited

U.S. PATENT DOCUMENTS

| | | | |
|---|---|---|---|
| 7,181,247 B1 * | 2/2007 | Melick et al. .............. | 455/562.1 |
| 7,747,409 B2 * | 6/2010 | Ladetto et al. ................ | 702/150 |
| 2006/0125644 A1 * | 6/2006 | Sharp ......................... | 340/573.1 |
| 2007/0260418 A1 * | 11/2007 | Ladetto et al. ................ | 702/150 |
| 2008/0077326 A1 * | 3/2008 | Funk et al. .................... | 701/220 |
| 2009/0043504 A1 * | 2/2009 | Bandyopadhyay et al. .. | 701/213 |
| 2011/0098921 A1 * | 4/2011 | Miller et al. .................. | 701/207 |
| 2012/0130632 A1 * | 5/2012 | Bandyopadhyay et al. .. | 701/446 |
| 2012/0143495 A1 * | 6/2012 | Dantu .......................... | 701/428 |
| 2012/0232838 A1 * | 9/2012 | Kemppi et al. ............... | 702/150 |
| 2013/0030700 A1 * | 1/2013 | Miller et al. .................. | 701/500 |
| 2013/0166195 A1 * | 6/2013 | Bandyopadhyay et al. .. | 701/412 |

FOREIGN PATENT DOCUMENTS

| | | |
|---|---|---|
| WO | WO 2009/021068 A1 | 2/2009 |
| WO | WO 2011/065931 A1 | 6/2011 |
| WO | WO 2011065931 A1 * | 6/2011 |

OTHER PUBLICATIONS

Storms et al., "Magnetic Field Navigation in an Indoor Environment," Proceedings of Ubiquitous Positioning Indoor Navigation and Location Based Service (UPINLBS), Oct. 2010.
Subbu et al., "Indoor Localization through Dynamic Time Warping," Proceedings of IEEE International Conference on Systems, Man and Cybernetics (SMC), pp. 1639-1644, Oct. 2011.

(Continued)

*Primary Examiner* — Khoi Tran
*Assistant Examiner* — Rachid Bendidi
(74) *Attorney, Agent, or Firm* — Oliff PLC

(57) ABSTRACT

There is provided a solution comprising detecting that a positioning device is within a predetermined control area associated with a building, acquiring a first sequence of magnetic field measurements carried out by the positioning device, wherein the first sequence represents at least one of the magnitude and the direction of Earth's magnetic field; determining that an operational environment of the positioning de-vice has changed between an indoor environment and an outdoor environment when a at least one predetermined criterion with respect to the first sequence is met; and causing actuation of a predetermined software function in or with respect to the positioning device when the operational environment of the positioning device has changed.

11 Claims, 5 Drawing Sheets

(56) References Cited

OTHER PUBLICATIONS

Haverinen et al., "Global Indoor self-localization based on the ambient magnetic field," *Robotics and Autonomous Systems*, vol. 57, pp. 1028-1035, 2009.

Riehle et al., "Indoor Waypoint Navigation via Magnetic Anomalies," Proceedings of 33$^{rd}$ Annual IEEE International Conference of the Engineering in Medicine and Biology Society (EMBS), pp. 5315-5318, Sep. 3, 2011.

Gozick et al., "Magnetic Maps for Indoor Navigation," *IEEE Transactions on Instrumentation and Measurement*, vol. 60, No. 12, pp. 3883-3891, Dec. 2011.

Glanzer et al., "Self-contained Indoor Pedestrain Navigation by Means of Human Motion Analysis and Magnetic Field Mapping," Proceedings of 7$^{th}$ Workshop on Positioning, Navigation and Communication (WPNC), pp. 303-307, Mar. 2010.

Kemppi et al., "Use of artificial magnetic anomalies in indoor pedestrian navigation," Proceedings of 72$^{nd}$ IEEE Vehicular Technology Conference (VTC), Sep. 2010.

Nov. 8, 2012 Finnish Search Report issued in Finnish Patent Application No. 20125031.

Nov. 8, 2012 Finnish Office Action issued in Finnish Patent Application No. 20125031.

Serra et al., 'Indoor Pedestrian Navigation System Using Modern Smartphone', MobileHCI 2010, pp. 397-398.

Jan. 2, 2014 Office Action issued in U.S. Appl. No. 13/927,854.

Oct. 28, 2013 Office Action issued in Finnish Patent Application No. 20125031.

\* cited by examiner

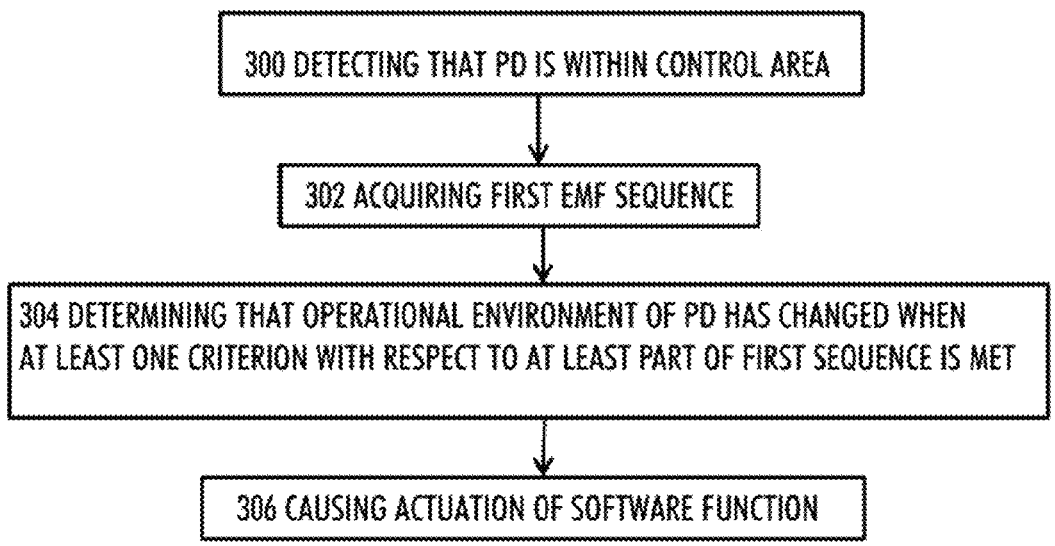
FIG. 3
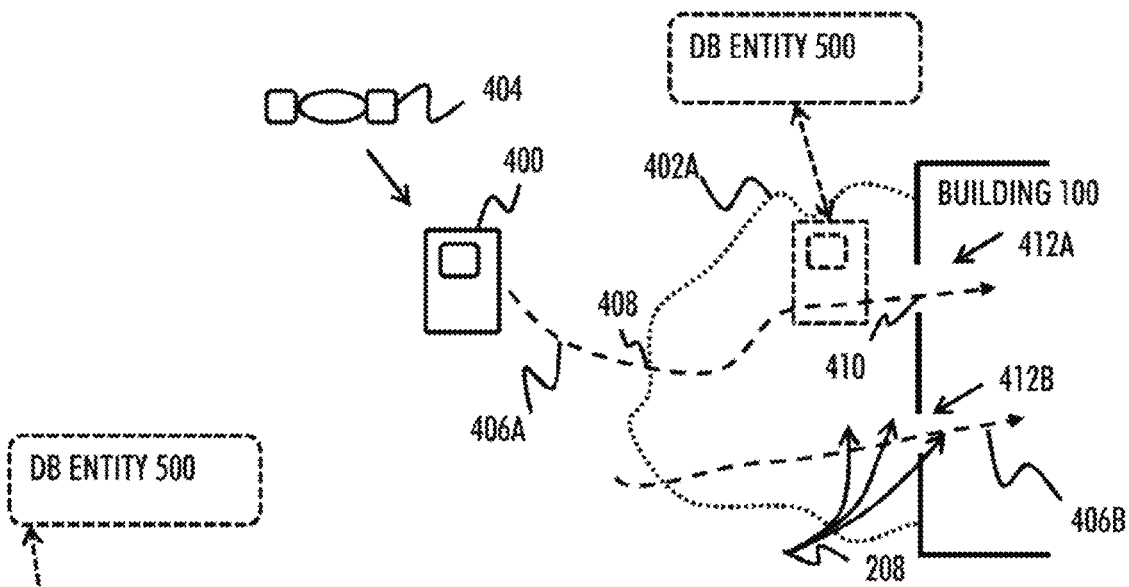
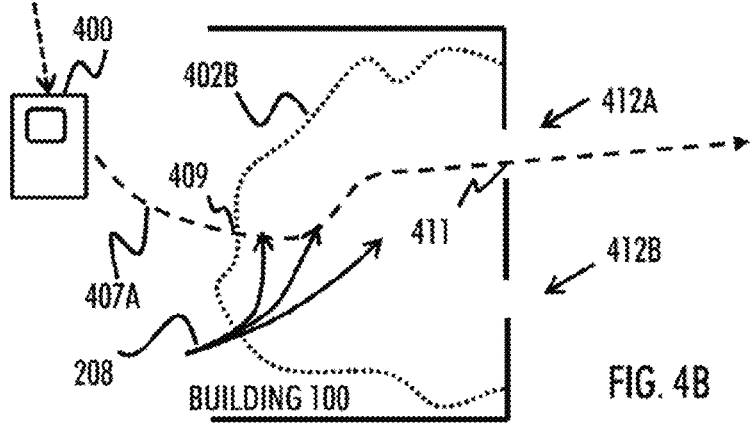
FIG. 4A
FIG. 4B

UTILIZING MAGNETIC FIELD BASED NAVIGATION

FIELD

The invention relates generally to indoor positioning systems. More particularly, the invention relates to utilization of the magnetic field based navigation, such as in detecting a change in the operational environment and initialization of a positioning device for location discovery and/or tracking.

BACKGROUND

It may be of importance to locate or track a user when the user is inside a building. However, a well-known outdoor positioning system employing a global positioning system (GPS) or any other satellite based system may not work inside a building due to lack of reliable reception of satellite coverage. Therefore, a positioning technique utilizing Earth's magnetic fields (EMF) indoors has been developed as one possible option for indoor location discovery. This type of location discovery applies, for example, a magnetic field strength measured by a positioning device. However, problems are related to this type of location estimation, especially in how to detect a change in the operational environment and how to initialize the positioning device for applying the EMF based positioning technique, for example.

BRIEF DESCRIPTION OF THE INVENTION

According to an aspect of the invention, there is provided an apparatus.

According to an aspect of the invention, there is provided a method.

According to an aspect of the invention, there is provided a computer program product embodied on a distribution medium readable by a computer and comprising program instructions which, when loaded into an apparatus, execute the method.

According to an aspect of the invention, there is provided an apparatus comprising means configured to cause the apparatus to perform any of the embodiments as described.

LIST OF DRAWINGS

In the following, the invention will be described in greater detail with reference to the embodiments and the accompanying drawings, in which FIG. 1 presents a floor plan of a building;

FIG. 3 shows a method according to an embodiment;

FIGS. 4A, 4B and 5 illustrate embodiments relating to detecting a change of operational environment, according to some embodiments;

Figure 6A:
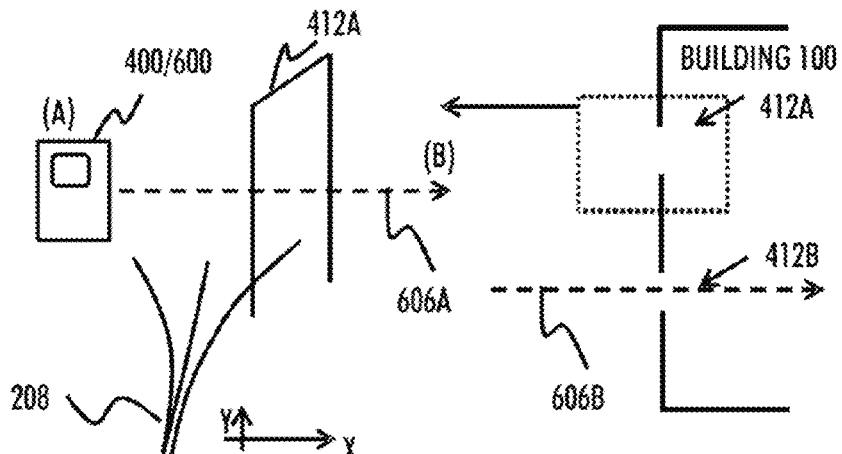
Figure 6B:
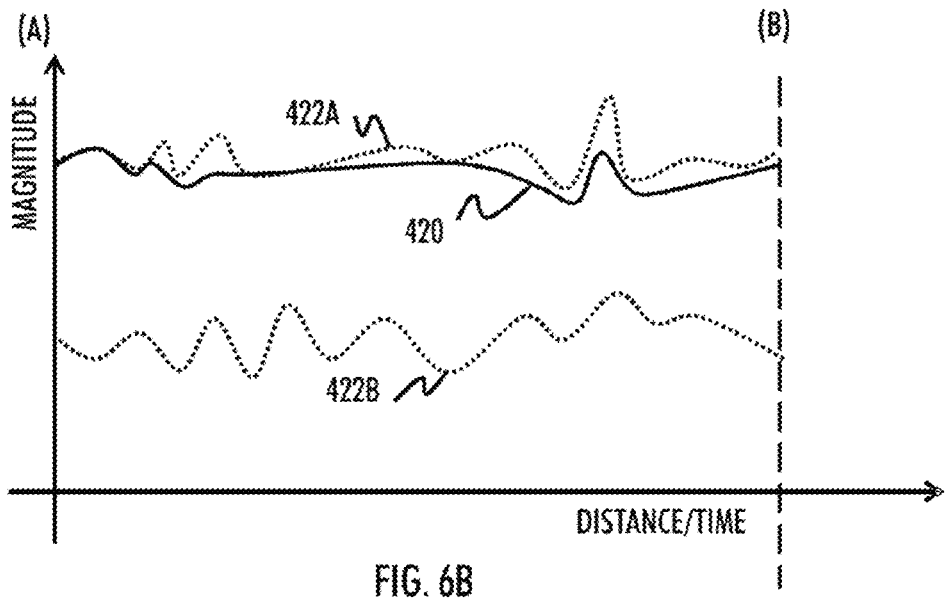
Figures 7A, 7B, 7C:
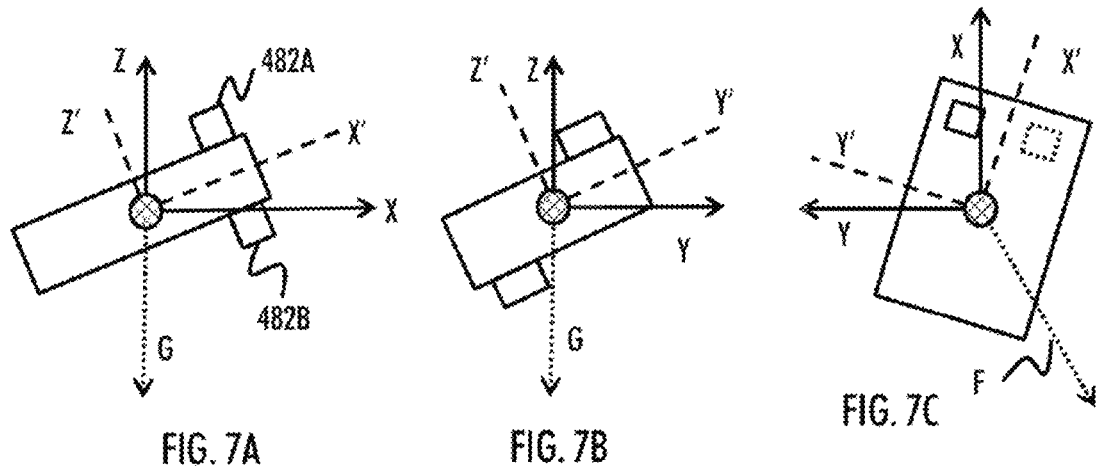
Figure 8:
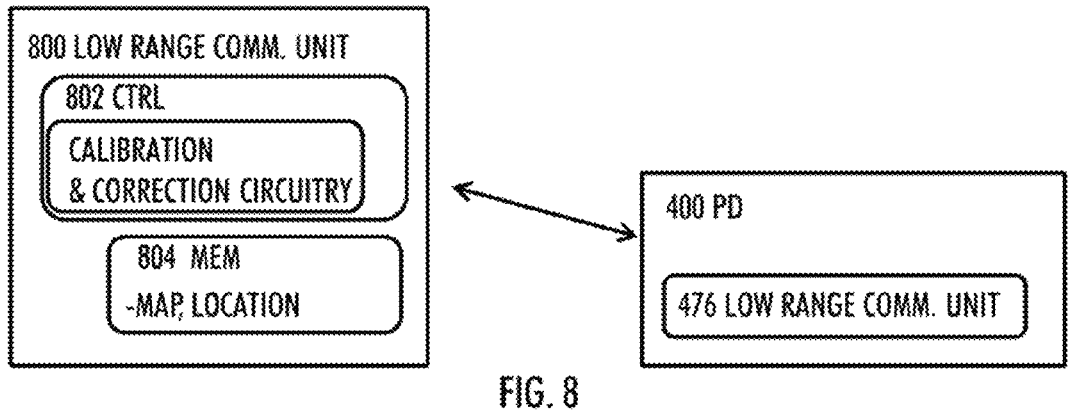
Figure 9:
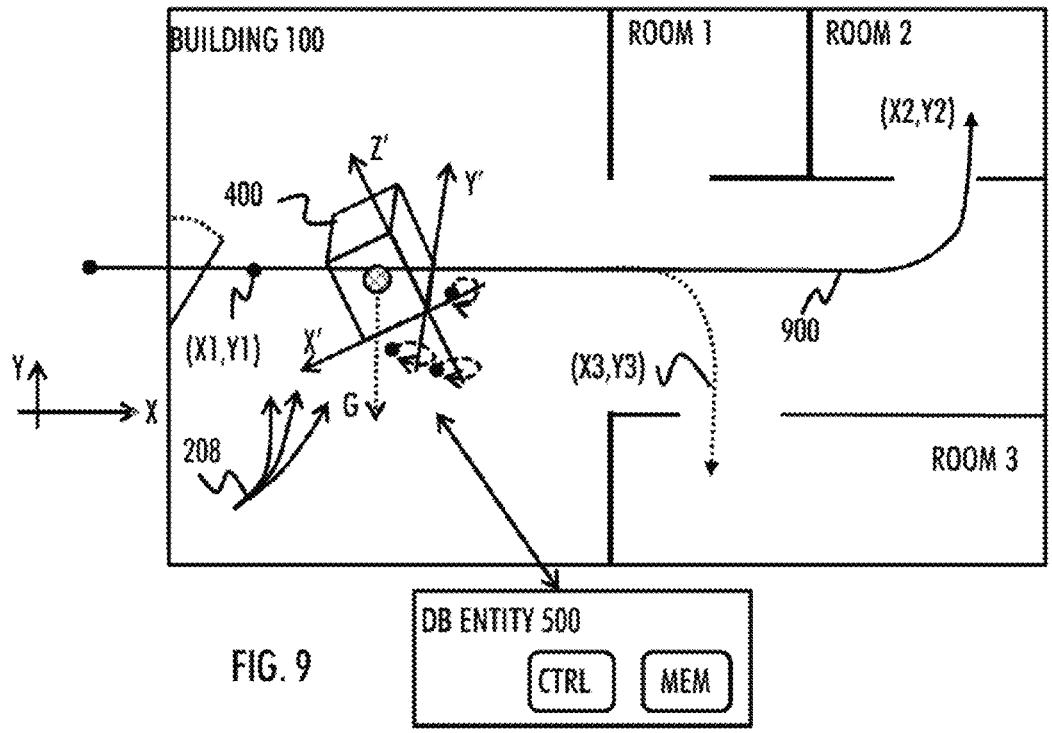

FIGS. 6A and 6B present some embodiments relating to identification of entry location;

FIGS. 7A to 7C show possible three dimensional orientations of the positioning device;

FIG. 8 illustrates an embodiment relating to a low range data transfer;

FIG. 9 shows an embodiment relating to deviation from expected path; and

Figure 10:
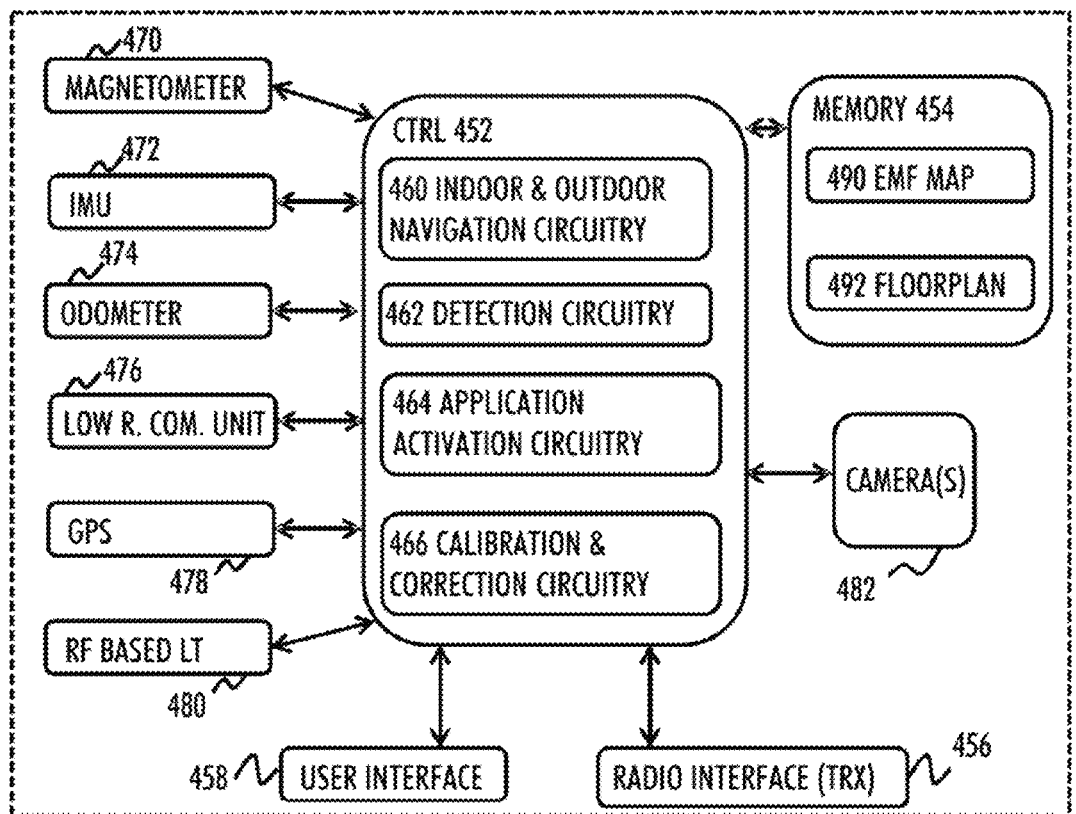
Figure 11:
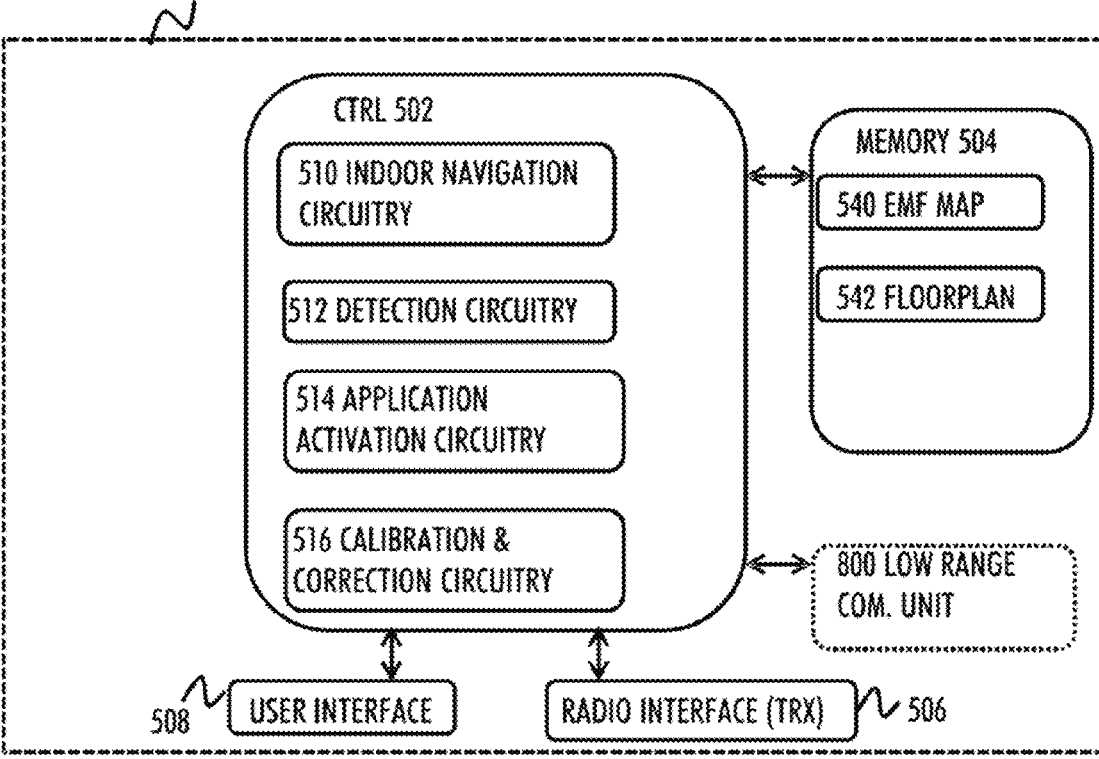

FIGS. 10 and 11 illustrate apparatuses according to embodiments.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In order to enable positioning, a radio frequency (RF) and/or GPS based location discovery and/or tracking is known. The GPS location discovery may not, however, be suitable for indoors due to lack of satellite reception coverage. Also the RF based location discovery and location tracking may only be possible by determining the indoor base station to which the user device is connected to, a round trip time of the RF signal, or the power of the received RF signal, for example. This type of location tracking may suffer from a lack of accuracy, for example, when the user gets located by two different RF base stations. Also, the coverage area of one base station may be wide resulting in poor accuracy. Some other known positioning measures, which may be applicable indoors, include machine vision, motion sensor and distance measuring, for example. However, each of these requires expensive measuring devices and equipment mounted throughout the building. As a further option, the utilization of Earth's magnetic field (EMF) may be applied.

The material used for constructing the building may affect the EMF measurable in the building and also the EMF surrounding the building. For example, steel, reinforced concrete, and electrical systems may affect the EMF. The EMF may vary significantly between different locations in the building and may therefore enable accurate location discovery and tracking inside the building based on the EMF local deviations inside the building. On the other hand, the equipment placed in a certain location in the building may not affect the EMF significantly compared to the effect caused by the building material, etc. Therefore, even if the layout and amount of equipment and/or furniture, etc., change, the measured EMF may not change significantly.

Figure 1:
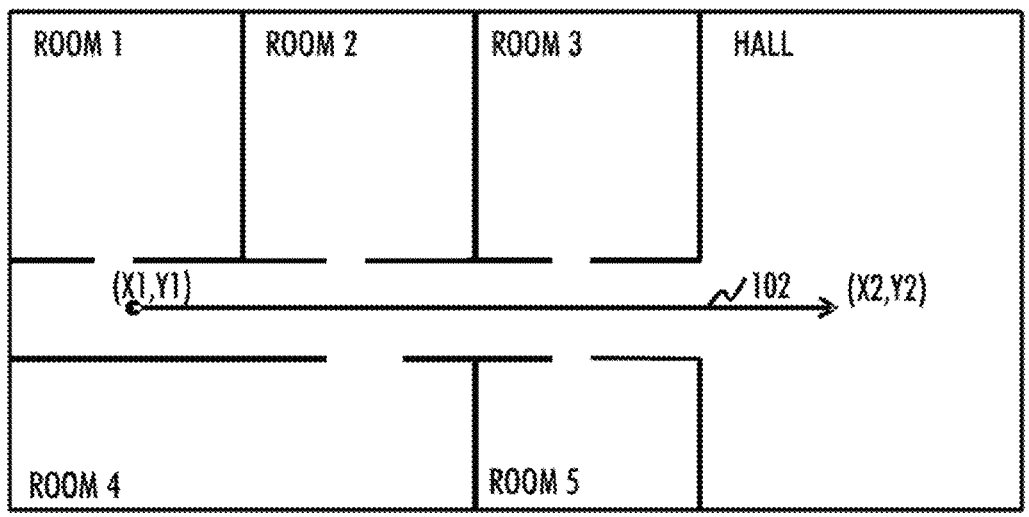

An example of a building 100 with 5 rooms, a corridor and a hall is depicted in FIG. 1. It is to be noted that the embodiments of the invention are also applicable to other type of buildings, including multi-floor buildings. The floor plan of the building 100 may be represented in a certain frame of reference. A frame of reference may refer to a coordinate system or set of axes within which the position, orientation, etc. are measured, for example. Such a frame of reference of the building in the example of FIG. 1 may be an XY coordinate system, also known in this application as the world coordinate system. The coordinate system of the building 100 may also be three dimensional when vertical dimension needs to be taken into account. The vertical dimension is referred with Z, whereas X and Y together define a horizontal two-dimensional point (X,Y). In FIG. 1, the arrow starting at a point (X1, Y1) and ending at a point (X2, Y2) may be seen as a path 102 traversed by a user associated with an EMF positioning device. The Z dimension is omitted for simplicity. The positioning device is detailed later, but for now it may be said, that the positioning device may comprise a magnetometer or any other sensor capable of measuring the EMF, such as a Hall sensor or a digital compass. The magnetometer may comprise at least one orthogonal measuring axis. However, in an embodiment, the magnetometer may comprise three-dimensional measuring capabilities. Yet in one embodiment, the magnetometer may be a group magnetometer, or a magnetometer array which provides magnetic field observation simultaneously from multiple locations spaced apart. The magnetometer may be highly accurate sensor and even small variations in the EMF may be noticed. In addition to the strength, also known as magnitude, intensity or density, of the magnetic field (flux), the magnetometer may be capable of determining a three-dimensional direction of a measured EMF vector. To this end, it should be noted that at any location, the Earth's magnetic field can be represented by a three-dimensional vector. Let us assume that a compass needle is tied at one end to a string such that the needle may rotate in any direction. The direction the needle points, is the direction of the Earth's magnetic field vector.

Figure 2A:
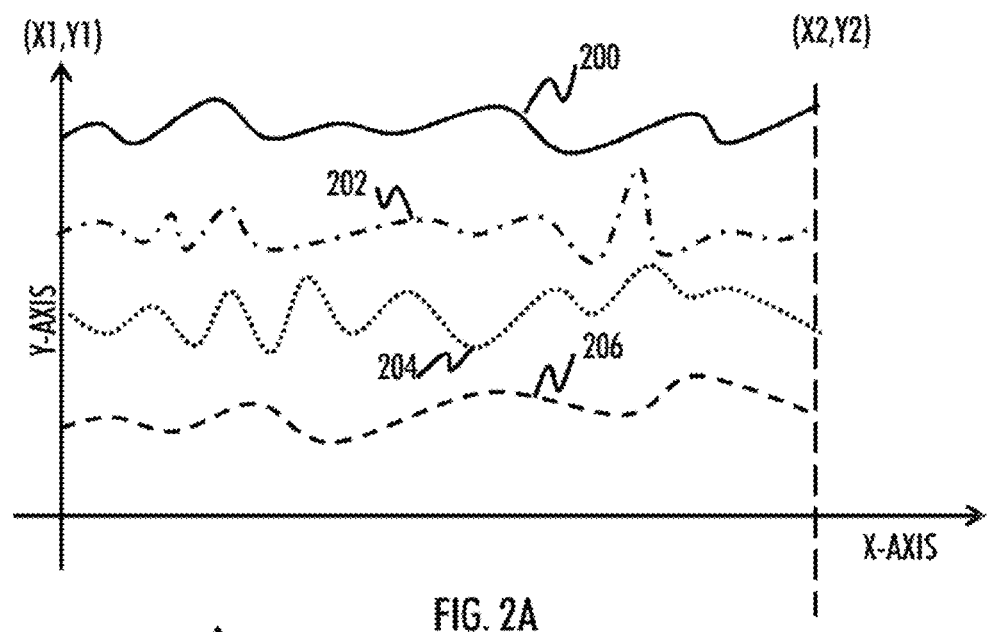
FIGS. 2A to 2C show a positioning device and an example measured magnetic field vector.
Figure 2B:
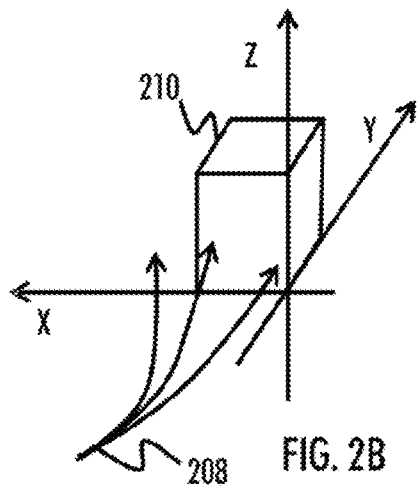
Figure 2C:
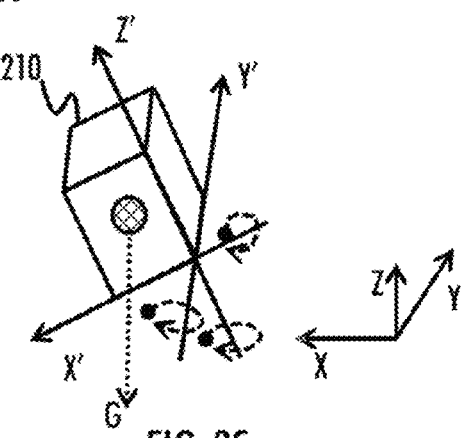

As said, the magnetometer carried by a person traversing the path 102 in FIG. 1 is capable of determining the three-dimensional magnetic field vector. Example three components of the EMF vector as well as the total strength are shown in FIG. 2A throughout the path 102 from (X1, Y1) to (X2, Y2). The solid line 200 may represent the total strength of the magnetic field vector and the three other lines 202 to 206 may represent the three component of the three dimensional magnetic field vector. For example, the dot-dashed line 202 may represent the Z component (vertical component), the dotted line 204 may represent the X component, and the dashed line 206 may represent the Y component. From this information, the magnitude and direction of the measured magnetic field vector may be extracted. FIG. 2B shows how the Earth's magnetic field 208 may be present at the location of an object 210. In FIG. 2B, the object 210 is oriented in the three-dimensional space (XYZ) according to the frame of reference of the building. However, typically the object is moving and the three-dimensional orientation of the object 210 may vary from the frame of reference of the building as shown in FIG. 2C. In this case, the three-dimensional frame of reference is not for the building but for the object 210, such as for the positioning device. Such frame of reference may be denoted with X', Y', and Z' corresponding to rotated X, Y, and Z of the world coordinate system. The G vector in FIG. 2C denotes the gravitational force experienced by the object 210.

In location tracking of the user or any target object moving in the building 100, the EMF vector measured by the positioning device carried by the user may be compared to existing information, wherein the information may comprise EMF vector strength and direction in several locations within the building 100. The information may depict an indoor Earth's magnetic field map. The positioning device of the user may comprise at least part of the EMF map, the positioning device may access the EMF map stored somewhere else in a network accessible by the positioning device, or the positioning device may forward the measured EMF vector data to a database entity or server which comprises or has access to the EMF map and thus is capable to locate the user in the floor plan of the building. Preferably but not necessarily, the EMF map covers most or all of the building so that the user may be reliably located without "black spots".

However, it may be cumbersome and time consuming for the user to detect a change in the operational environment, such as a change between indoors (e.g. the building 100) and outdoors, and perform required actions based on that. At least partly for this reason, a solution is provided in which it is, with reference to FIGS. 3, 4A and 4B, detected in step 300 that the positioning device (PD) 400 is within a predetermined control area 402A, 402B associated with a building, such as a building 100, for example. The control area 402A may be inside the building 100 or the control area 402B may be outside the building 100. The control area 402A, 402B may have a regular form, such as a circle around an entry door 412A, 412B, for example. Alternatively, the control area 402A, 402B may have an irregular form. The control areas 402A and 402B may be defined to be partly overlapping. Also, the control area 402B may be somewhere inside the building 100, not necessarily comprising or being coupled to the entry door 412A, 412B. Alternatively, the control area 402A may be somewhere outside the building 100, not necessarily comprising or being coupled to the entry door 412A, 412B. In an embodiment, it may be detected that the PD 400 is within the control area 402A or 402B on the basis of positioning information obtained from the outdoor positioning system and/or from the magnetic field based positioning system. As said, the outdoor positioning system may be a satellite 404 based navigation system or an RF signal based navigation system, for example. When the control area 402B is indoors, the presence of the positioning device 400 within the control area may be determined on the basis of EMF based navigation system applying an existing EMF map of the building 100, or some other indoor navigation system, for example. However, in an embodiment, the presence of the PD 400 in the outdoor control area 402A may also be detected by applying the magnetic field based positioning system. This is because, for example, in locations with a high density of buildings, such as in cities, the magnetic field variations may be large also outside the buildings (i.e. in the control area 402A in front of the entry 412A). The detection of the PD 400 being present in the location area may be made by the position device itself (if the PD 400 has knowledge of the control areas 402A, 402B), or by a database entity 500 to which location related information from the PD 400 is sent via a wireless interface. The database entity 500 may have access or comprise the required information related to the EMF map of the building and to the control area 402, 402B, for example.

Further, it is proposed to acquire in step 302 a first sequence of magnetic field measurement carried out by the PD 400 upon detecting that the PD 400 is within the predetermined control area 402A, 402B. Let us assume that the PD 400 traverses a path 406A in FIGS. 4A and 407A in FIG. 48. In FIG. 4A, the PD 400 is located outdoors. The arrival of the PD 400 at the control area 402A at point 408 may be detected by means of GPS 404, for example. As the PD 400 arrives to the control area 402A at point 408, the PD 400 may start to activate a magnetometer in order to make EMF measurements 208 from which the first sequence is determined. It may be advantageous to determine such control area 402A so that the magnetometer of the PD 400 need not be on all the time, but it may be triggered on when the PD 400 is at the control area 402A. In FIG. 4B, the PD 400 is indoors and the arrival of the PD 400 to the control area 402B along path 407A may be detected from EMF 208 based navigation system. Here, depending on the circumstances, the PD 400 may have already been applying such EMF based navigation system indoors even before arriving to the control area 402B which may provide required information for detecting the arrival of the PD 400 to the control area 402B. Alternatively, the arrival of the PD 400 to the control area 402B may be known from another indoor location discovery and/or tracking system. These may employ RF based navigation, odometer, inertial measurement units, at least one camera taking images which images are compared to an image database in order to detect the location of the PD 400, etc. As the PD 400 arrives to the control area 402B at point 409, the PD 400 may start or continue to make EMF measurements 208 from which the first sequence is determined. The first sequence may represent at least one of the magnitude and the direction of Earth's magnetic field. In one embodiment, the EMF measurements may provide information regarding the XYZ components of the EMF 208, as shown in FIG. 2A, from which the direction and/or magnitude are derivable. However, in one embodiment, only the magnitude is obtained without separating the XYZ components of the EMF. The first sequence may comprise at least one EMF measurement. The first sequence may be updated continuously or according to predetermined intervals with new measurements from the PD 400. Thus, the length of the first sequence may increase as the PD 400 moves along the path 406A or 40M. The PD 400 may acquire the first sequence by measuring the EMF 208. Alternatively or in addition to, the database entity 500 may acquire the first sequence by receiving data related to the first sequence or to the measured EMF 208 from the PD 400.

Further, it is proposed to determine in step 304 that an operational environment of the positioning device 400 has changed between an indoor environment and an outdoor environment when at least one predetermined criterion with respect to at least part of the first sequence is met. The at least one predetermined criterion is detailed later but for now it may be said that the first sequence may be monitored alone or in comparison to another sequence. The first sequence may be monitored continuously in order to detect the change in the operational environment or it may be monitored according to predetermined intervals, or it may be monitored once the EMF 208 measurements to be comprised in the first sequence are finished, which may take place once a predetermined time limit expires, for example. The change of operational environment may be detected when the PD 400 has moved from outdoor to indoors at point 410 of FIG. 4A, or from indoors to outdoors at point 411 in FIG. 4B. It should also be noted that the detection of the change may be performed by the positioning device 400 or by a database entity 500. In the latter case, the positioning device 400 may wirelessly be connected to the database entity 500 performing the computational processing related to the detection, for example.

In an embodiment, when it is detected in step 304 that the operational environment of the positioning device 400 has changed at point 410 or at point 411, an actuation of a predetermined software function in or with respect to the positioning device 400 may be automatically caused in step 306. The database entity 500 may cause the activation by sending a command to the PD 400, or the PD 400 may cause the activation itself. Such a predetermined software function may comprise for example a navigation system. When the operational environment changes from outdoors to indoors or from indoors to outdoors, it may be advantageous to change into using a corresponding navigation system. Therefore, an activation of either an application employing an indoor magnetic field based positioning system or an application employing an outdoor positioning system may be caused in the positioning device 400 when the operational environment of the positioning device 400 has changed. The application employing the indoor magnetic field may use an indoor magnetic field map representing at least one of magnitude and direction of Earth's magnetic field 208 affected by the local structures of the building 100 at a given location inside the building 100. This way the embodiment provides a seamless navigation even if the user moves from outdoors to indoors, or vice versa. By knowing or accessing the existing EMF map data, the PD 400 may be able to determine its location in the building 100 by comparing the measured EMF vector to the EMF map.

In another embodiment, such a predetermined software function may comprise for example a reference to a social network. For example, such a reference may be a check-in to the Facebook Places, Foursquare social network, a status update to the Facebook, or to the Twitter, wherein the status update refers to the location of the user associated with the PD 400, for example. In other words, when it is detected that the operational environment has changed, for example, from outdoors to indoors, the PD 400 may automatically check-in to the Foursquare. This may be advantageous for the user so that the user need not himself perform the reference to the social network. Further, as will be described later, the entry of the building among a plurality of entries may optionally be detected. This may further aid in specifying the check-in location of the user to the building so that the check-in location may correspond to the specific entry of the building.

Figure 5:
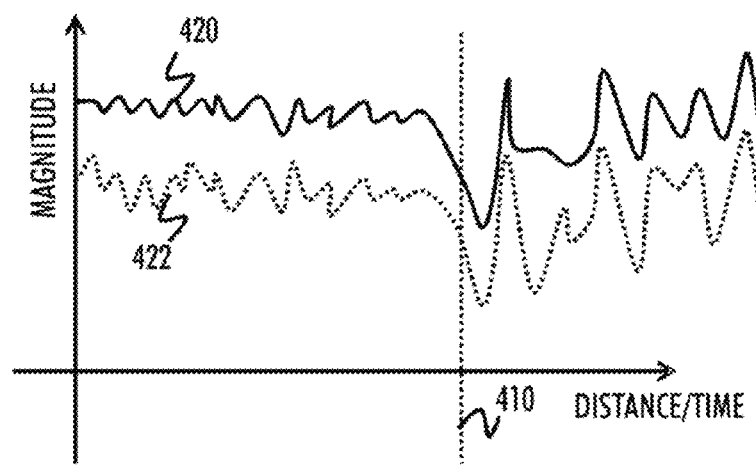

Let us now take a look at how it is determined that the operational environment has changed. FIG. 5 shows an example first sequence 420 obtained from measurements carried out by the PD 400 along traversing the path 406A of FIG. 4A, for example. For simplicity reasons, only the magnitude of the EMF 208 is depicted by the first sequence 420. It may be that the PD 400 has measured only the magnitude, or it may be that the magnitude is derived from the XYZ components of the measured EMF 208. It should be noted that the detection of operational environment change may be similarly detected by observing the direction of the EMF 208 from the measured EMF vector, in case the first sequence 420 depicts the XYZ components of the EMF 208. In addition to or alternatively, the XYZ components of the EMF vector 208 may be observed separately in order to detect the operational environment change. Such use of multiple parameters may further aid in the detection. In particular, it is to be noted that a behavior of a first sequence representing the vector of the EMF 208 may change when moving from outdoors to indoors, or vice versa. However, as said, in FIG. 5 only the magnitude of the EMF 208 is depicted for simplicity reasons. It may be seen that the magnitude of the EMF 208 changes at point 410, i.e. at the point of entry to the building 100. This is because the EMF 208 is then affected by the local structures of the building 100, such as reinforced concrete walls, steel door frames, etc. From such a change in at least one property of the first sequence 420, it may be derived that the operational environment has changed. Thus, in an embodiment, the at least one criterion is a predetermined change in a property derivable from the first sequence 420. The property may be any property obtained from the sequence 420. An example property is a statistical property, such as at least one of the following: a variance of the first sequence 420, a peak amplitude of the first sequence 420, an expectation value of the first sequence 420, a frequency spectrum of the first sequence 420. When, for example, the variance of the first sequence 420 increases, it may be detected that the PD 400 has moved to indoors. The variance, for example, may be determined on a sliding window basis, wherein the window captures a predetermined length of the first sequence 420. Then, the window is moved and it is detected if the (local) variance is different from the previous window. Alternatively, the property may be observed continuously as the length of the first sequence 420 increases. When the property, such as the expectation value, changes sufficiently, it may be detected that the operational environment has changed. There may be a predetermined threshold (based for example on empirical experiments) which is used to determine if the change in the property is sufficient for a classifier to detect a change in the operational environment. As can be seen from the first sequence 420 presented in FIG. 5, the variance of the sequence 420 outdoors (before the point 410) is relatively low, whereas the variance indoors (after the point 410) has a higher value. Similarly it may be seen that changes in the peak amplitude, in the expectation value and in the frequency spectrum take place when looking at the first sequence 420 on both sides of the point 410.

In an embodiment, the at least one criterion is a predetermined similarity between the first sequence 420 and a second magnetic field sequence 422, as shown in FIG. 5. The second sequence 422 may be determined beforehand and represent a true magnetic field sequence for a path comprising a change of operational environment, such as a part or whole of one of the paths 406A or 406B comprising the entry 412A, 412B, respectively. In practice it may be that a part or whole of the path 406A, for example, has been measured in a controlled manner so as to obtain the second sequence 422. The prior measurement may have been measured several times to ensure the reliability. The part of the path 406A may comprise the vicinity of the entry 412A, for example. In this embodiment, the sequences 420 and 422 in FIG. 5 may be seen to represent this relatively short part of the path 406A, wherein the short part comprises the entry 412A to the building 100. In meters, the length of the sequence 422 may be for example couple of meters, such as around two meters. By comparing the two sequences 420 and 422, the similarity or correlation may be determined, for example, as a cross-correlation value, or by applying a dynamic time warping (DTW) algorithm, which is an algorithm for measuring similarity between two sequences which may vary in time or speed. If the similarity value exceeds a predetermined threshold, then it may be determined that the operational environment has changed. This embodiment may provide a reliable indicator for a change of an indoor-to-outdoor transition or vice versa.

As said, the second sequence 422 may be obtained from prior measurements carried out in a controlled manner. The controlled manner may refer to the three-dimensional orientation of a measuring device, as will be described later. In an embodiment, as shown in FIG. 6A, the second sequence 422 for at least one predetermined path 606A, 606B may be acquired based on magnetic field 208 measurements carried out by at least one measuring device 600. Each of the at least one predetermined paths 606A, 606B comprises an entry to the building, such as the entry 412A, 412B, respectively, to the building 100. The path 606A may thus be seen as part of the path 406A, for example. The measuring device 600 may be a client of a social network or a special purpose measurement device, for example. For example, a client (a user) of the Foursquare or Facebook Places, may manually indicate in the application which building he/she has entered. The client may also indicate the entry location of the building. As this is part of the client's typical behavior, it is advantageous that such clients may also, when entering the building, measure the EMF 208 during the path 606A, 606B of entry. In this manner, the data sequence 422 is obtained for the indicated entry. As there are many users making such reference to the social network, the number of EMF sequences 422 acquired for one path 606A, 606B may be high, thus increasing reliability. Alternatively, the measurement may be made by a special purpose measurement device individually for each path 606A, 606B. In this way the reliability of correct second sequence 422 is high. Moreover, each measuring device 600 or user associated to the measuring device 600 may add attributes or context (metadata) to the second sequence 422, such as who measured it, what was the date and time of the measurement, were there any disturbances, etc. These may be used to verify the reliability of the measurement, and thus the reliability of the comparison between the first sequence 420 and the second sequence 422.

In an embodiment, as shown in FIGS. 6A and 68, it may be assumed that the at least one measuring device 600 has measured the path 606A, 606B, each path 606A, 606B comprising an entry 412A, 412B to the building. The acquired second sequences 422A and 422B, respectively, may be seen in FIG. 6B. As the EMF sequences 422A and 422B are obtained and they may be identified to the specific entries 412A and 412B, the place of entry of the positioning device 400 travelling either of the paths 606A or 606B (as part of the routes 406A, 406B) may be accurately determined. This may be done by comparing the first magnetic field sequence 420 and the at least one second, true magnetic field sequence 422A, 422B in order to obtain a path hypothesis for the positioning device 400. Although FIG. 6B shows only magnitude, the comparison may be made, alternatively or additionally, between the directions of the measured first sequence 420 and the predetermined second sequences 422A, 4022B and/or between the XYZ components of the measured first sequence 420 and the predetermined second sequences 422A, 4022B. The path hypothesis may be acquired for both of the paths 606A, 606B. However, typically one of the path hypothesis show higher probability of accuracy based on the similarity measure between the first sequence 420 and the second sequence 422A, 422B. As a consequence, it may be possible to determine which of the at least one predetermined path 606A, 606B the positioning device 400 has traversed on the basis of the comparison. For example, the first sequence 420 may be compared (continuously, at predetermined intervals, on a sliding window basis, or at the end) to both of the seconds sequences 422A, 422B. Then, a similarity measure is determined for both of the second sequences 422A, 4228 and the one showing sufficient similarity may be selected as the point of entry. Such comparison may take place by using a pattern recognition method where the measured first sequence 420 is compared to the true second sequences 422A, 422B. For example, in FIG. 6B it may be determined that the similarity between the first sequence 420 and the second sequence 422A is higher than the similarity between the first sequence 420 and the second sequence 422B. Thus, it may be determined that the PD 400 has traversed path 606A, i.e. has entered to the building through the entry 412A. It may be advantageous to perform such comparison so that, not only the change of operation environment is detected, but also the exact location of entry may be identified without needing the EMF map for the whole building of entry. Only EMF map for the entry locations 412A, 412B may be used. Knowing the exact location of entry in to the building 100, may serve as a trigger to cause the initialization of the PD 400 with at least part of the EMF map of the building 100, wherein the part of the EMF map comprises at least the location of entry 412A, 4128.

A further advantage may be that the positioning device 400 may be initialized with the indoor location estimate corresponding to the identified location, i.e. the entry 412A or 4128. To enable the correct initial location estimation significantly enhances the efficiency of indoor positioning system, such as the EMF based navigation system. For example, when the indoor positioning system applies a multi-hypothesis location estimation, the number of different hypothesis may in the beginning include over 1000 location hypothesis for the positioning device 400. Therefore, it may be understood that it may take a lot of time to converge to the correct hypothesis. By enabling the initial location estimate, the efficiency of the location discovery is increased as the number of location hypothesis may be reduced closer to the identified entry 412A or 412B. Thus, the time of convergence to the correct location may be reduced.

In an embodiment, as shown in FIGS. 5 and 6B, the X-axis may represent time domain. In other words, the horizontal X-axis may provide time stamps for the measured data sequence 420, for example. When the positioning device 400 stops for some reason during the path 406A, for example, the positioning device 400 starts to provide identical or close to identical EMF measurements values. Also such a moment of standing still may be detected by using another technique such as images captured by the PD 400, an odometer, etc. Thus, it may be that the PD 400 is configured to capture images when measuring the first sequence 420, which images may be compared against an image database. The entity acquiring the first sequence 420 (OD 400 or database entity 500) may need to cut a part of the sequence 420 away, wherein the cut part corresponds to the measurement performed while the positioning device 400 is standing still. This may be needed so as to allow efficient comparison against the true second sequence 422 of EMF values. It should be noted that the second true sequence 422 may be measured by a moving measuring device.

However, in an embodiment, the X-axis represents distance moved by the positioning device 400. The motion estimate needed for the distance representation may be acquired from at least one motion sensor coupled to the positioning device 400. The motion sensor may be comprised in an inertial measurement unit (IMU). The motion sensor may comprise for example at least one acceleration sensor or an odometer. The motion sensor may detect the movement of the positioning device and provide as output an estimate of the movement. The estimate may comprise at least the amount of movement, i.e. for example, how many meters the positioning device 400 has moved and/or how many steps the person carrying the PD 400 has taken. In addition, the direction of the movement may be determined by the motion sensor. The distance information obtained may be used to pair the measured EMF value to a distance. Thus, it is possible to represent the first magnetic field sequence 420 as a function of distance with respect to the motion of the positioning device 400. This may be beneficial for the comparison of two sequences 420 and 422. For example, the second sequence 422 may have been measured so that the measuring device 600 has been moving along the path. Now the first sequence 420 may also be directly represented in the distance domain. Thus, even if the person with the positioning device 400 providing the first sequence 420 has stopped at some point along the path, the first sequence 420 in the distance domain may still be directly comparable to the second sequence 422.

As said, the measuring device 600 measures the EMF vectors for the paths 606A, 606B in a controlled manner in order to provide second sequences 422A, 422B. The controlled manner may refer to the three-dimensional orientation of a measuring device. In other words, the measuring device 600 may be kept in a correct three-dimension orientation so that the frame of reference of the measuring device 600 corresponds to the frame of reference of the building 100, for example, as shown in FIG. 2B. However, a person carrying the positioning device 400 may not all the time keep the positioning device 400 in correct angles with respect to the frame of reference of the building 100 represented with XYZ coordinates. In particular, the positioning device 400 may be rotated about at least one of the three axis X, Y and Z, as shown in FIG. 2C. This may lead to inaccurate EMF measurements being carried out by the positioning device 400 with respect to the direction of the EMF vector being and, thus, lead to erroneous or inefficient location discovery and/or tracking or to erroneous or non-optimal initial location estimate. It should be noted that although observing the magnitude may in some cases be sufficient for detecting the change of the operational environment and/or for the location estimation/tracking, observing the direction may provide additional accuracy and efficiency. This is because more information, including the direction, may be utilized. For example, when two entries have similar EMF magnitude models, the knowledge of the XYZ components of the EMF vector, or the knowledge of the both, the magnitude and the direction of the EMF vector may aid in differentiating these entries. As said, the direction and the magnitude may be derived from the XYZ components of the EMF vector. Therefore, in an embodiment, information indicating the three-dimensional orientation of the positioning device 400 may be acquired by the PD 400 or by the database entity 500 at the at least one time instant when the EMF vector is measured, wherein the EMF vector is measured by the positioning device 400 and defined in the frame of reference (X', Y', Z') of the positioning device 400, as shown in FIG. 20. However, (X', Y', Z') is not the same as (X, Y, Z). Thus, error may occur without adjusting/rotating/correcting the acquired EMF vector from the frame of reference (X', Y', Z') of the positioning device 400 to the frame of reference (X, Y, Z) of the floor plan. The adjustment may be made at least partly on the basis of the acquired information indicating the three-dimensional orientation (X', Y', 1) of the positioning device 400.

The three-dimensional orientation of the measuring device 400 may be defined by at least one of the following: a rotation with respect to a first horizontal axis (such as X-axis or Y-axis), a rotation with respect to a second horizontal axis (such as Y-axis or X-axis, respectively), and a rotation with respect to a vertical axis Z. Let us consider this in more detail by referring to FIG. 7. In FIG. 7, the solid arrows represent the world XYZ coordinate system and the dotted lines show the frame of reference of the positioning device 400. FIG. 7A shows how the positioning device 400 may be rotated about Y-axis. In FIG. 7, the X direction represents the direction from the point (A) to the point (B) in FIG. 6A, for example. That is, in FIG. 7A, the Y-axis points towards the paper. In FIG. 7B, the positioning device 400 is rotated about X-axis, which points towards the paper. In order to determine the amount of rotation about the Y-axis (FIG. 7A) and about X-axis (FIG. 7B), the positioning device may be in one embodiment equipped with inertial measurement unit (IMU) 472 as shown in FIG. 10. The IMU 472 may comprise at least one acceleration sensor utilizing a gravitational field. The IMU 472 may optionally also comprise other inertial sensors, such as at least one gyroscope, for detecting angular velocities, for example. The acceleration sensor may be capable of detecting the gravitational force G. By detecting the acceleration component G caused by the Earth's gravitation in FIGS. 7A and 7B, the positioning device 400 may be able to determine the amount of rotation about axis X and/or Y. In another embodiment, the IMU 472 may detect the movement of the person carrying the positioning device 400. This may advantageously allow the speed and direction of the person to be determined, thus resulting in determination of positioning device 400 location along the path 606A at a given time, as indicated above.

Although the rotation about the X and Y axis may in general be correctable because the global reference (the gravitational force G) is present, the rotation about the Z-axis as shown in FIG. 7C may not be corrected as easily. This may be due to lack of the global reference similar to G. Rotations relative to the positioning device 400 may be detected by using the at least one gyroscope comprised in the IMU 472. However, the gyroscope may not be able to follow the absolute rotation in the world coordinate system. In addition, the gyroscope may drift from the correct orientation due to gyroscope sensor inaccuracies such as sensor noise and bias. However, for the correction about the Z axis, another global reference may be used than the gravitational force G. Let us look at this next.

Let us assume that the positioning device 400 measures EMF vectors at any given point inside the building 100. Let us also assume that there exists an EMF map for the building 100, or at least for a part of the building 100, such as for the entries 412A, 412B. The EMF map may indicate EMF vector magnitude and/or three-dimensional direction for a given location in the building 100 or in a part of the building 100. As said, incorrect orientation of the positioning device 400 may lead to erroneous results or to a situation where only the magnitude of the EMF vector can be utilized but not the direction of the EMF vector in addition to the magnitude of the EMF vector. Therefore it is beneficial to adjust the measured magnetic field vector from the frame of reference of the positioning device 400 to the frame of reference of the floor plan the building 100. This may be done at least partly on the basis of the knowledge of the direction of the true magnetic field vector F, as referred in FIG. 7C, at the location where the positioning device 400 is assumed to be located (i.e. at the location hypothesis of the positioning device 400). It should be noted that the measured EMF vector, such as the first sequence 420, may originally be defined in the frame of reference of the positioning device 400 having an arbitrary three-dimensional orientation, thus possibly leading to useless data with respect to the EMF vector direction. The direction of the true magnetic field vector for the at least one position hypothesis of the positioning device 400 may be determined on the basis of a predetermined EMF map at the at least one location corresponding to the at least one position hypothesis of the positioning device 400. The predetermined EMF map may comprise position hypothesis outside the building and/or inside the building. For example, when adjusting the measured EMF vector direction with respect to the first sequence 420 (measured by the positioning device 400), it may be beneficial to have true EMF vector values also outside the building 100 along the path comprising the entry to the building 100. However, when correcting the measured EMF vector direction for a PD 400 locating indoors, the predetermined EMF map may be the indoor EMF map. When using multi-hypotheses location estimation, the number of hypotheses in the beginning may be large, such as over 1000 hypotheses. However, by knowing the direction of references F and G at each of the plurality of position hypothesis, the three-dimensional orientation of the positioning device 400 may be adjusted to, or at least close to, the correct frame of reference.

For example, when there are two position hypotheses, the three-dimensional orientation adjustment at the correct location hypothesis performs better than at the false location hypothesis. This is because, when correcting the rotation based on Earth's gravitation G, the inclination of the measured EMF vector should approach the true EMF vector inclination F. If this is not the case, the position hypothesis may be determined as not correct or the probability of the reliability of the position hypothesis may be given a low value. This is because at a false position hypothesis, a wrong EMF vector direction F may be used. On the contrary, the orientation adjustment at the correct position hypothesis based on G, makes the measured inclination and true inclination F to be closer to each other. Then, the three-dimensional orientation correction based on F may be conducted, i.e. the three-dimensional orientation of the positioning device 400 with respect to the rotation about the Z-axis may be corrected at least partly based on F. The correction may be performed by the PD 400 or the database entity 500. Such three-dimensional orientation correction may be conducted even off-line if the positioning device 400 is equipped with the EMF map data. This way the three-dimensional orientation of the positioning device 400 may be adjusted properly and correct values of EMF measurement vector may be obtained.

However, in case the rotation about the z-axis cannot be corrected, which may be due to the lack of EMF map data (i.e. a global reference) for the location or location hypothesis of the PD 400, it may still be advantageous to determine the magnitude of the XY-plane projection and the magnitude of the Z-component. As said, the rotations about the XY-plane may be corrected using the global reference G. Namely, the norm of the XY-plane projection $\|m\|_{xy}$ of the EMF vector m=(x,y,z) may be determined as $\|m\|_{xy}$=sqrt($x^2+y^2$) even without adjusting the rotation about the Z-axis. As a result, the feature vector (z, $\|m\|_{xy}$) may be computed from the tilt compensated magnetic field observation, which feature vector is invariant to the rotation about the Z-axis. These two features enable for more EMF vector information than the magnitude alone, because the magnitude may be represented separately for the Z-axis component and for the XY-plane projection.

This may additionally allow for representing the first sequence 420 as a function of distance which may be beneficial, as indicated before. In this case, the representation as a function of distance may be obtained through the location estimation (e.g. by using a multi-hypothesis location estimation) even without odometers or alike being comprised in the positioning device 400. The orientation adjustment may allow efficient location estimation based on direction of the EMF 208, in addition to or instead of the magnitude of the EMF 208. In an embodiment, the detection of operational environment change for the positioning device, and the location estimation is conducted separately for each entry of the building. In other words, the acquired measured EMF data is compared against the EMF data provided by the map for each entry location. As a result, each entry may be associated with a location estimate of the positioning device 400 as a function of time. The location estimate may represent the distance moved by the positioning device 400. As the location estimate is known for each entry as a function of time, each point of time may be associated with a distance moved and with a measured EMF vector (first sequence 420). Thus, it may be possible to generate the first sequence 420 as a function of distance. At the correct entry location, the localization result may be statistically more consistent, and the similarity between the mapped EMF vector sequence 422A, 422B and the first sequence 420 may be higher.

In an embodiment, the three-dimensional orientation correction at least partly based on the true magnetic field vector direction F is performed for determining probabilities for position hypotheses applied by multi-hypothesis location estimation. In this case, the orientation correction may be performed at each position hypothesis. The multi-hypothesis location estimation may comprise 1) applying a motion model for at least part of the position hypotheses based on the motion information, 2) orientation adjustment from the frame of reference of the PD 400 to the frame of reference of the building 100 (or to another predetermined frame of reference), 3) comparing the measured, orientation adjusted EMF vector (or computed feature vector) to the EMF vector (or computed feature vector) acquired from the map at position hypothesis, 4) determining probability of being a correct hypothesis for each position hypothesis on the basis of the comparison and optionally also on the basis of the reliability of the orientation adjustment, and 5) updating a posteriori probability distribution represented by the position hypotheses. Step 1-5 may be repeated without limit for a predetermined number of times, or as long as a certain threshold with respect to accuracy or characteristics of a posteriori probability distribution is met. At some point in time, the position hypotheses close to the correct position may have high probabilities, whereas the false positions may be associated with low probabilities (or lower probabilities). This way it may be determined, at each point of time, where the PD 400 is located in the building. Once the location estimates are converged, the tracking of the object, such as the PD 400, may be started. The orientation correction using the map data as the global reference may advantageously allow the multi-hypothesis location estimation to converge faster to the correct position/location hypothesis.

In an embodiment, the orientation correction is implemented, e.g., by applying an orientation filter for MARG (Magnetic, Angular Rate, and Gravity) sensor implementation in each position hypothesis. The MARG sensor contains a three-axis magnetometer, a three-axis angular rate sensor, and a three-axis accelerometer. The orientation filter can be, e.g., a quaternion, gradient decent, Kalman filter (KF), or extended Kalman filter (EKF) based implementation, or a hybrid implementation. Each position hypothesis may maintain own orientation estimate, which is periodically updated, by the orientation filter, for each new sensor observation consisting of acceleration, angular velocity, and magnetic field measurements. For each update step, the true EMF vector F is used as the global magnetic field reference by the orientation filter. The vector F is acquired from the map at the location indicated by the specific location hypothesis, and is used by the orientation filter together with the sensor observation to update the orientation estimate of the specific location hypothesis.

In an embodiment as shown in FIG. 8, it is detected that the operation environment of the positioning device 400 has changed from the outdoor environment to the indoor environment. This may be done as described earlier, for example, by observing changes in a property of the first sequence 420. Next, the indoor location of the positioning device 400 may be identified on the basis of a low range data transfer performed by the positioning device 400, wherein the low range data transfer applies at least one of the following: a radio frequency identification (RFD) technique, a Bluetooth communication protocol, a machine readable bar code, a IEEE 802.15.4 communication protocol. It should be noted that in an embodiment, the change of the operational environment of the PD 400 may be detected on the basis of a low range data transfer performed by the PD 400. Thus, in this case, no observation of the changes in a property of the first sequence 420 is needed. The PD 400 may be equipped with suitable hardware and software (low range communication unit 476 of FIGS. 8 and 10) which allows the PD 400 to communicate through the low range communication. For this reason, there may be a low range communication unit 800 mounted at a predetermined location, such as close to the entry point 412A, 412B of FIG. 4, for example. As the predetermined location of the unit 800 is known, the initialization of the PD 400 with the identified location may be performed. For example, the location may be stored in the memory 804 operatively coupled to the unit 800 in order to initialize the PD 400 with the indoor location estimate corresponding the identified location (i.e. the predetermined location of the low range communication unit 800). The low range communication unit 800 may provide communication properties in such a low range that it may be assumed that the PD 400, when communicatively coupled to the low range communication unit 800, is in the same physical location as the low range communication unit 800. This may allow for fast convergence of the location estimation of the PD 400.

For example, let us assume that the low range communication unit 800 is the first RFID unit 800. Then, the PD 400 also comprising a second RFID unit 476 may read information comprised in the first RFID unit 800. The information may comprise the location of the first RFID unit 800, for example. Based on this information, the PD 400 may initialize its location estimate. The PD 400 may also activate the indoor navigation system, if not already activated. The information may be comprised in the memory coupled to the first RFID unit 800, or the first RFID unit 800 may provide access information to a network element where the information is stored. Alternatively, the first RFID unit 800 may read information from the second RFID unit 476 of the PD 400, wherein the information may comprise network access address of the PD 400. Then network access equipment couple to the first RFID unit 800 may cause the initialization of the PD 400 with the location estimate and possibly with the EMF map data through the network. In either case, the data may also provide information enabling a network access establishment between the PD 400 and a network element, such as the database entity 500. The information may include network address of the PD 400 and/or the network address of the network element, such as the database entity 500.

In an embodiment, the low range communication unit 800 may be coupled to a controller 802 and to a calibration circuitry & correction circuitry for co-operating in calibration of the PD 400. For example, the exact magnitude of the EMF may be predetermined and stored in the memory 804. Then the PD 400 may apply this information in obtaining knowledge of how much the measured EMF magnitude deviates from the indicated, true EMV magnitude. Based on the information, a correction of the values provided by the magnetometer or calibration of the magnetometer may be in order. The calibration or correction process may be carried out in various manners. Let us consider the case where two RFID units are connected to each other. The second RFID unit 476 of the PD 400 may receive the true magnetic field information from the first RFID unit 800. Then the positioning device 400 may apply the received information in calibration of its magnetometer in order for the magnetometer to provide accurate and true EMF vector data. Alternatively, the positioning device 400 may apply the received information in correcting each value provided by the magnetometer so as to provide accurate and true EMF vector data. In another embodiment, the PD 400 may inform the correction that needs to be used for the EMF vector data received from this specific positioning device 400 to any element handling the EMF values provided by this specific positioning device 400. It should be clear that the difference between the true and measured EMF vectors may be determined at the positioning device 400 or at the first RFID unit 800, as the case may be. The calibration/correction may be for the strength of the EMF vector, and/or for an EMF bias (offset) vector affecting to the EMF measurements acquired by the positioning device 400. Alternatively, or in addition to, the calibration/correction may be for the direction of the EMF vector. The calibration process may also calibrate/correct data related to the direction and/or strength of the measured acceleration vector representing the direction of the gravitational force G. For this, the true value for G may be previously determined for the predetermined location of the low range communication unit 800.

The exact location of the PD 400 after entry to the building 100 may be referred to as a control point. The control point may be any point at which the location of the PD 400 may be accurately known. Therefore, according to the embodiment explained with reference to FIG. 6B, the door 412A may be seen as an example control point. The control point may be the location where the magnetic field based navigation system in the PD 400 is activated and the initialization of the location of the PD 400 is performed, for example. In an embodiment, the arrival to the control point may be determined on the basis of the low range communication unit 800 and/or on the basis of comparison of the first and the second sequence, for example. In an embodiment, the arrival to the control point may be determined on the basis of at least one image captured by the positioning device 400 and compared to a database of images representing the control points. The image may have been captured when the three-dimensional orientation of the PD 400 is according to predetermined rules. The database of images may reside in the memory of the PD 400 or of the database entity 500. In the latter case, either the database of images is accessible by the PD 400 or the images captures by the PD 400 are transmitted to the database entity 500 for review.

In an embodiment as shown in FIG. 9, upon detecting that the operation environment of the positioning device 400 has changed from the outdoor environment to the indoor environment (i.e. the PD 400 is indoors), a database entity 500 may acquire information on a path 900 the positioning device 400 is expected to traverse and information on an expected indoor magnetic field 208 sequence for the path 900. The expected sequence may be based on the indoor magnetic field map for the path 900, wherein the EMF map may be stored in the memory of the database entity 500. The information of the expected path 900 may be acquired manually from the user of the positioning device 400, for example. Alternatively, the positioning device 400 may comprise information which indicates the path 900 of travel within the building 100, such as an origin (X1, Y1) and a destination (X2, Y2). It may further be that information on a measured indoor magnetic field is acquired from the positioning device 400 based on magnetic field measurements carried out by the positioning device 400 in the building 100 during movement of the position device 400 along the path 900. As the database entity 500 may be aware of the expected sequence and the measured sequence, the database entity 500 may determine whether the positioning device 400 has deviated from the expected path 900 based on a comparison between the measured indoor magnetic field and the expected indoor magnetic field sequence. There may be a threshold set, and when the threshold is exceeded, it may be determined that deviation has taken place. The threshold may be with respect to the magnitude and/or direction of the EMF vector in comparison with the expected sequence. In order to obtain the distance travelled, i.e. to be able to map the measured EMF vector to a distance, the EMF based location tracking may be conducted or the positioning device 400 may be equipped with an odometer or alike. When at least one predetermined criterion (such as a predetermined threshold) with respect to the comparison result is met, the database entity 500 may cause actuation of a software application in or with respect to the positioning device 400. Such software function may be for example removal of access right(s) in the building 100. For example, in FIG. 9 it may be determined at point (X3, Y3) that the PD 400 has deviated from its expected path 900. Such determination may be based on a predetermined amount of difference between the EMF vector measured and the corresponding EMF vector of the expected sequence. Alternatively, the sequence may be observed over several measured vectors and when a predetermined number of vectors show differences between the EMF vector measured and the corresponding EMF vector of the sequence, it may be determined that deviation has occurred. As said, at point (X3, Y3) the deviation may have been detected. Then the database entity 500 may remove access rights to the Room 3 from the PD 400. Thus, the door to Room 3 will not open to PD 400. That is, the positioning device 400 may be precoded with certain information related to access rights within the building 400. Based on the deviation from the course 900, the access rights may be changed, removed or added. In the latter case, it may be seen that the deviation is allowable but the door to Room 3 will not open to the PD 400. Therefore, it may be advantageous to add access rights to the Room 3. In an embodiment, the database entity 500 may inform the user of the PD 400 via a communication message to the PD 400 that a deviation has occurred and invite the user to return to the expected path 900.

In an embodiment, the EMF bias (offset) vector affecting to the EMF vector measurements acquired by the positioning device 400 may be determined based on the difference between the measured EMF vector and the true EMF vector at the location or at the location hypothesis of the positioning device 400, wherein the true EMF vector may be obtained from the EMF map of the building 100. Once the bias is determined, it may be added to or deducted from the measured value in order to obtain the correct EMF vector value, such as the correct magnitude of the EMF. The bias thus represents the difference of the measured value and the true value. It may be that the bias is caused by the equipment to which the PD 400 is mounted, or by a metallic object locating near (e.g. in a pocket or in a bag of a user) the PD 400. For example, when the PD 400 is mounted to the shopping cart, the cart may cause the same bias to the measured EMF values at each location of the building 100. Then it may be advantageous to first measure the bias at one predetermined location and then apply the bias in other places inside the building 100. The predetermined location may be detected as described above. Alternatively, the bias may be computed individually for each location hypothesis at the beginning of the location estimation process, and the bias estimate for each hypothesis may be updated incrementally/periodically during the location estimation and/or tracking process. It should be noted that this procedure may also aid in determining probabilities for the location hypothesis. For example, if the location hypothesis, where the bias is determined, is correct, the bias is properly determined and may increase the probability of the true location hypothesis due to correct, bias adjusted EMF vector observations. However, if the location hypothesis is not correct, the bias determined at that position may be false. This false bias may also lead to erroneous EMF vector observations from the point of view of the incorrect position hypothesis, which may decrease the probability associated with the false location hypothesis, and, thus, promote the correct location/position hypothesis. In addition or alternatively to the bias, a scaling factor may be similarly determined and applied. The scaling factor may be used to calibrate the magnetometer of the PD 400 so that it provides EMF vector magnitude values which are comparable to the EMF vector magnitude values provided by another measuring device used to generate the EMF map. In addition, if the bias and/or scaling factor are updated incrementally/periodically for each location hypothesis, the statistical properties, such as variance, of the bias/scaling factor estimates may further provide information about the correctness of the specific position hypothesis.

Embodiments, as shown in FIGS. 10 and 11, provide apparatuses 400 and 500 comprising at least one processor 452, 502 and at least one memory 454, 504 including a computer program code, which are configured to cause the apparatuses to carry out functionalities according to the embodiments. The at least one processor 452, 502 may each be implemented with a separate digital signal processor provided with suitable software embedded on a computer readable medium, or with a separate logic circuit, such as an application specific integrated circuit (ASIC).

The apparatuses 400 and 500 may further comprise radio interface components 456 and 506 providing the apparatus 400, 500, respectively, with radio communication capabilities with the radio access network. The radio interfaces 456 and 506 may be used to perform communication capabilities between the apparatuses 400 and 500. For the transmission and/or reception of information, the apparatuses may apply, for example, wireless cellular radio network. Alternatively, for example, short range radio communication techniques including wireless local area network and Bluetooth, may be applied. The radio interfaces 456 and 506 may be used to communicate data related to the EMF map, the measured EMF vectors, location estimation, initialization, etc.

User interfaces 458 and 508 may be used in operating the measuring device 400 and the database entity 500 by a user. The user interfaces 458, 508 may each comprise buttons, a keyboard, means for receiving voice commands, such as microphone, touch buttons, slide buttons, etc.

The apparatus 400 may comprise the terminal device of a cellular communication system, e.g. a computer (PC), a laptop, a tabloid computer, a cellular phone, a communicator, a smart phone, a palm computer, or any other communication apparatus. In another embodiment, the apparatus is comprised in such a terminal device: e.g. the apparatus may comprise a circuitry: e.g. a chip, a processor, a micro controller, or a combination of such circuitries in the terminal device and cause the terminal device to carry out the above-described functionalities. Further, the apparatus 400 may be or comprise a module (to be attached to the terminal device) providing connectivity: such as a plug-in unit, an "USB dongle": or any other kind of unit. The unit may be installed either inside the terminal device or attached to the terminal device with a connector or even wirelessly. The apparatus 500 as the database entity may be comprised in the network accessible by the apparatus 400 of FIG. 4.

As said, the apparatus 400, such as the positioning device, may comprise the at least one processor 452. The at least one processor 452 may comprise an indoor & outdoor navigation circuitry 460 for performing indoor or outdoor navigation. The indoor navigation may be on the basis of Earths magnetic field measurement and EMF map, on the basis of RF signal strengths, and/or on the basis of visual or distance based location estimation. The circuitry 460 may also be responsible for identifying the correct position in the building 100 and to cause initialization of the PD 400 with the location estimate and/or with the at least part of the EMF map. The circuitry 460 may apply for example multi-hypotheses location estimation. A detection circuitry 462 may be for detecting a change in the operational environment of the PD 400 based on observing the first sequence 420 of FIG. 5 or based on comparison of the first sequence 420 and the second sequence 422, for example. An application activation circuitry 464 may be responsible of activation of a software function in or with respect to the PD 400. Such function may be for example the check-in in Foursquare or Facebook Places, activation of indoor navigation system, change in the access rights of the PD 400, etc. A calibration & correction circuitry 466 may be responsible of performing a calibration process of a magnetometer 470 and/or correcting the acquired information from the magnetometer 470, for example.

The magnetometer 470 may be used to measure the EMF vector. There may be various other sensors or functional entities comprised in the positioning device 400. These may include an inertial measurement unit (IMU) 472, an odometer 474, a low range communication unit 476, a GPS sensor 478, a radio frequency (RE) based location tracking sensor 480, at last one camera 482, for example. A skilled person understood that there may be of use when performing the embodiments as described earlier. For example, the RF based location tracking sensor 480 may detect the RE signal from a near-by base station and determine a location of the PD 400 based on the signal strength. The IMU 472 and the odometer 472 may be used to detect movement of the PD 400 and to enable three-dimensional orientation estimation of the PD 400. The IMU 472 may comprise for example acceleration sensor and a gyroscope, for example. The GPS sensor 478 may aid in outdoor navigation. The at least one camera 482 may be used to capture images for the purposes of any of the embodiments described. As shown in FIG. 7A, the PD 400 may comprise one camera on each side of the PD 400, i.e. cameras 482A and 482B) in order to enable capturing images from the ceiling and from the floor, for example. Such additional information may be useful in locating the PD 400 in the building with more accuracy. The memory 454 may comprise information of the magnetic field map 490 and of the floor plan 492 of the building 100, for example. The memory may also be used for storing measured EMF values, for example. However, as said, the EMF map data and/or the floor plan may be also stored in the apparatus 500, for example, wherein the positioning device 400 has a network access to the apparatus 500.

Although not shown, the apparatus 400 may comprise a MARG sensor (described above) which may comprise or apply one or more of the functional entities of the apparatus 400, such as the magnetometer 470, an inertial measurement unit (IMU) 472, an odometer 474, etc.

The apparatus 500, such as the database entity, may comprise the at least one processor 502. The at least one processor 502 may comprise several circuitries. As an example, an indoor navigation circuitry 510 for performing indoor navigation on the basis of Earth's magnetic field measurement and EMF map, on the basis of RF signal strengths, and/or on the basis of visual or distance based location estimation. For the navigation, the memory 504 may comprise the EMF map 540 and the floor plan 542 of the building 100, for example, or have access to that information. The circuitry 510 may perform the location discovery and tracking based on measured EMF vectors acquired from the positioning device 400. Then the database entity 500 may indicate the position of the PD 400 within the building 100. Alternatively, the circuitry 510 may provide, on request, at least part of the generated indoor magnetic field map to the positioning device 400 that is to determine its location inside the building to which the EMF map is applicable. The indoor navigation circuitry 510 may provide the entire EMF map of the building 100 to the positioning device 400 via network. Alternatively, the indoor navigation circuitry 510 may provide only a part of the EMF map to the positioning device, wherein the part of the generated indoor EMF map to provide is selected on the basis of location estimate of the positioning device. The location estimate may be acquired from a non-magnetic field based location discovery system. For example, if the building is equipped with another location discovery system, such as for example indoor base station based location discovery, the information provided by that other location technique may be used. Such additional data may obtained by the RF based location tracking unit 480 of the positioning device 400, transmitted to the database entity 500 and processed in the database entity 500, for example. The information stored relating to the other non-magnetic based navigation system may comprise the mounting location of the indoor base stations, for example. By knowing the location of the positioning device 400, at least roughly, the circuitry 510 may then provide EMF map only for the area where the positioning device 400 is currently moving, such as for the floor of the building where the positioning device 400 currently is. This may be advantageous so that only a part of the large EMF map needs to be communicated to the positioning device. The positioning device 400 may then use the map or part of the map in locating itself in the building 100. The circuitry 510 may also be responsible for identifying the correct position in the building 100 and to cause initialization of the PD 400 with the location estimate and/or with the at least part of the EMF map 540. The circuitry 510 may apply for example multi-hypothesis location estimator/tracker/filter.

A detection circuitry 512 may be for detecting a change in the operational environment of the PD 400 based on observing the first sequence 420 of FIG. 5 or based on comparison of the first sequence 420 and the second, true sequence 422, for example. An application activation circuitry 514 may be responsible of causing an activation of a software function in or with respect to the PD 400. The database entity 500 may for example indicate to the PD 400 that an activation of software function is in order. Such function may be for example the check-in in Foursquare or Facebook Places, activation of indoor navigation system, removal of access rights, etc. A calibration & correction circuitry 516 may be responsible of causing or co-operating in a calibration process of a magnetometer 470 of the PD 400 and/or correcting the acquired information from the magnetometer 470, for example. The calibration may be performed by the circuitry 516 for example when the low range data communication unit 800 of FIG. 8 is operatively coupled to the database entity 500, for example. Further, the calibration & correction circuitry 516 may be responsible of making the orientation correction with respect to the frame of reference of the PD 400. As said, in an embodiment, the positioning device 400 is aware of the (X, Y, Z) world coordinate system and makes the correction between the frame of references itself before indicating the direction of the EMF vector to the database entity 500. In another embodiment, the measuring device 400 indicates the possibly uncorrected EMF vector direction to the database entity 500 along with information regarding the three-dimensional orientation of the measuring device 400, and the database entity 500 makes the correction/adjustment by the calibration & correction circuitry 516 so as to yield the true direction of the magnetic field vector to be comprised in the generated EMF map.

As may be understood by a skilled person from the description of the embodiments throughout the application and from FIGS. 10 and 11, the embodiments may be performed in the positioning device 400, in the database entity 500, or the execution of embodiments may be shared among the positioning device 400 and the database entity 500. The skilled person also understands that any required filtering logic may be applied to filter the EMF measurements in order to improve the accuracy.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

According to an embodiment, there is provided an apparatus comprising processing means configure to carry out an embodiment according to any of the FIGS. 1 to 11. In an embodiment, the at least one processor 452 or 502, the memory 454 or 504, respectively, and a corresponding computer program code form an embodiment of processing means for carrying out the embodiments of the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor and at least one memory including a computer program code, wherein the at least one memory and the computer program code are configured to, with the at least one processor, cause the apparatus at least to:

detect that a positioning device is within a predetermined control area associated with a building;

upon detecting that the positioning device is within the predetermined control area, start acquiring a first sequence of magnetic field measurements carried out by the positioning device, wherein the first sequence represents at least one of the magnitude and the direction of Earth's magnetic field;

determine that an operational environment of the positioning device has changed between an indoor environment and an outdoor environment when at least one predetermined criterion with respect to at least part of the first sequence is met, wherein the at least one predetermined criterion comprises a predetermined similarity between the first sequence and at least one second magnetic field sequence, wherein each second sequence is determined beforehand and represents a true magnetic field sequence for a path comprising a change of operational environment;

compare the first magnetic field sequence and the at least one second true magnetic field sequence in order to obtain at least one path hypothesis for the positioning device, wherein each path hypothesis is associated with a probability that the positioning device has traversed the path corresponding to the second magnetic field sequence; and automatically cause a predetermined operation of an application in or with respect to the positioning device when the operational environment of the positioning device has changed, wherein the operation to be performed is based on the probabilities of the path hypotheses.

2. The apparatus of claim 1, wherein the apparatus is further caused to:

cause activation of either an application employing an indoor magnetic field based positioning system or an application employing an outdoor positioning system in the positioning device when the operational environment of the positioning device has changed, wherein the application employing the indoor magnetic field uses an indoor magnetic field map representing at least one of magnitude and direction of Earth's magnetic field affected by the local structures of the building at a given location inside the building.

3. The apparatus of claim 1, wherein the apparatus is further caused to:

detect that the positioning device is within the control area on the basis of positioning information obtained from the outdoor positioning system and/or from the magnetic field based positioning system.

4. The apparatus of claim 1, wherein the apparatus is further caused to:

determine the direction of a true magnetic field vector for at least one position hypothesis of the positioning device, wherein the direction of the true magnetic field vector for the at least one position hypothesis is based on a predetermined magnetic field map at the at least one location corresponding to the at least one position hypothesis of the positioning device, and wherein the predetermined magnetic field map is defined in a frame of reference of the floor plan of the building; and adjust the measured magnetic field vector direction from a frame of reference of the positioning device to the frame of reference of the floor plan the building at least partly on the basis of the direction of the true indoor magnetic field vector, wherein the measured magnetic field vector is originally defined in the frame of reference of the positioning device having an arbitrary three-dimensional orientation.

5. The apparatus of claim 1, wherein the apparatus is further caused to:

acquire motion estimate of the positioning device from at least one motion sensor coupled to the positioning device; and apply the acquired motion estimate in order to represent the first magnetic field sequence as a function of distance with respect to the motion of the positioning device.

6. The apparatus of claim 1, wherein the at least one criterion is a predetermined change in a property derivable from the first sequence.

7. The apparatus of claim 1, wherein the apparatus is further caused to:

acquire the second true magnetic field sequence, for at least one predetermined path based on magnetic field measurements carried out by at least one measuring device, wherein each predetermined path comprises an entry to the building;

compare the first magnetic field sequence and the second true magnetic field sequence in order to obtain a path hypothesis for the positioning device; and determine which of the at least one predetermined path the positioning device has traversed on the basis of the comparison.

8. The apparatus of claim 1, wherein the apparatus is further caused to:

detect that the operation environment of the positioning device has changed from the outdoor environment to the indoor environment;

identify the indoor location of the positioning device on the basis of a low range data transfer performed by the positioning device, wherein the low range data transfer applies at least one of the following: a radio frequency identification technique, a Bluetooth communication protocol, a machine readable bar code, a IEEE 802.15.4 communication protocol; and cause initialization of the positioning device with the indoor location estimate corresponding the identified location.

9. The apparatus of claim 1, wherein the apparatus is further caused to:

detect that the operation environment of the positioning device has changed from the outdoor environment to the indoor environment;

acquire information on a path the positioning device is expected to traverse and information on an expected indoor magnetic field sequence for the path, wherein the expected sequence is based on an indoor magnetic field map for the path;

acquire information on a measured indoor magnetic field based on magnetic field measurements carried out by the positioning device in the building during movement of the positioning device along the path;

determine whether the positioning device has deviated from the expected path based on a comparison between the measured indoor magnetic field and the expected indoor magnetic field sequence; and cause actuation of a software application in or with respect to the positioning device when at least one predetermined criterion with respect to the comparison result is met.

10. The apparatus of claim 1, wherein the apparatus is further caused to:

determine a bias or a scaling factor of the measured magnetic field vector based on the difference between the measured magnetic field vector and the true magnetic field vector at the location/location hypothesis of the positioning device, wherein the true magnetic field vector is obtained from the indoor magnetic field map of the building; and apply the determined bias in location estimation/tracking of the positioning device.

11. A method, comprising:

detecting, by a database server or by a positioning device, that the positioning device is within a predetermined control area associated with a building;

upon detecting that the positioning device is within the predetermined control area, start acquiring a first sequence of magnetic field measurements carried out by the positioning device, wherein the first sequence represents at least one of the magnitude and the direction of Earth's magnetic field;

determining that an operational environment of the positioning device has changed between an indoor environment and an outdoor environment when a at least one predetermined criterion with respect to the first sequence is met, wherein the at least one predetermined criterion comprises a predetermined similarity between the first sequence and at least one second magnetic field sequence, wherein each second sequence is determined beforehand and represents a true magnetic field sequence for a path comprising a change of operational environment;

comparing the first magnetic field sequence and the at least one second true magnetic field sequence in order to obtain at least one path hypothesis for the positioning device, wherein each path hypothesis is associated with a probability that the positioning device has traversed the path corresponding to the second magnetic field sequence; and automatically causing a predetermined operation of an application in or with respect to the positioning device when the operational environment of the positioning device has changed, wherein the operation to be performed is based on the probabilities of the path hypotheses.

* * * * *